United States Patent

Fleischer

[15] 3,642,231
[45] Feb. 15, 1972

[54] BRAKE MECHANISM FOR FISHING REELS

[72] Inventor: Oscar Fleischer, 2610 S.W. 21st St., Miami, Fla. 33145

[22] Filed: Dec. 8, 1969

[21] Appl. No.: 883,097

Related U.S. Application Data

[63] Continuation of Ser. No. 869,489, Oct. 27, 1969.

[52] U.S. Cl. ............................................................242/219
[51] Int. Cl. ....................................................A01k 89/02
[58] Field of Search..................242/211, 212, 213, 215, 216, 242/217, 218, 219, 84.5

[56] References Cited

UNITED STATES PATENTS

| | | | |
|---|---|---|---|
| 1,934,109 | 11/1933 | Wemp | 192/70.14 X |
| 2,417,732 | 3/1947 | Bland et al. | 242/218 X |
| 2,760,736 | 8/1956 | Mihalko et al. | 242/217 |
| 2,977,065 | 3/1961 | Holahan, Jr. | 242/218 |
| 3,017,135 | 1/1962 | Wood, Jr. | 242/218 |
| 3,428,268 | 2/1969 | Fleischer | 242/84.5 X |
| 3,432,114 | 3/1969 | Meisner | 242/219 |

*Primary Examiner*—Billy S. Taylor
*Attorney*—Salvatore G. Militana

[57] ABSTRACT

A brake mechanism for fishing reels having a splined shaft, an operating handle for rotating the shaft in one direction only there being means to prevent the reverse rotation of the shaft and a spool with a plurality of alternatingly positioned brake discs and spool driven discs mounted on the shaft and within the hub of the spool. The brake discs rotate freely of the spool but in unison with the shaft while the driven discs rotate in unison with the spool and freely of the shaft, means being provided to adjust the amount of frictional engagement of the discs upon the axial movement of the splined shaft whereby the desired amount of drag may be applied to the spool.

2 Claims, 10 Drawing Figures

OSCAR FLEISCHER INVENTOR
BY
Salvatore G. Militana
attorney

INVENTOR
OSCAR FLEISCHER

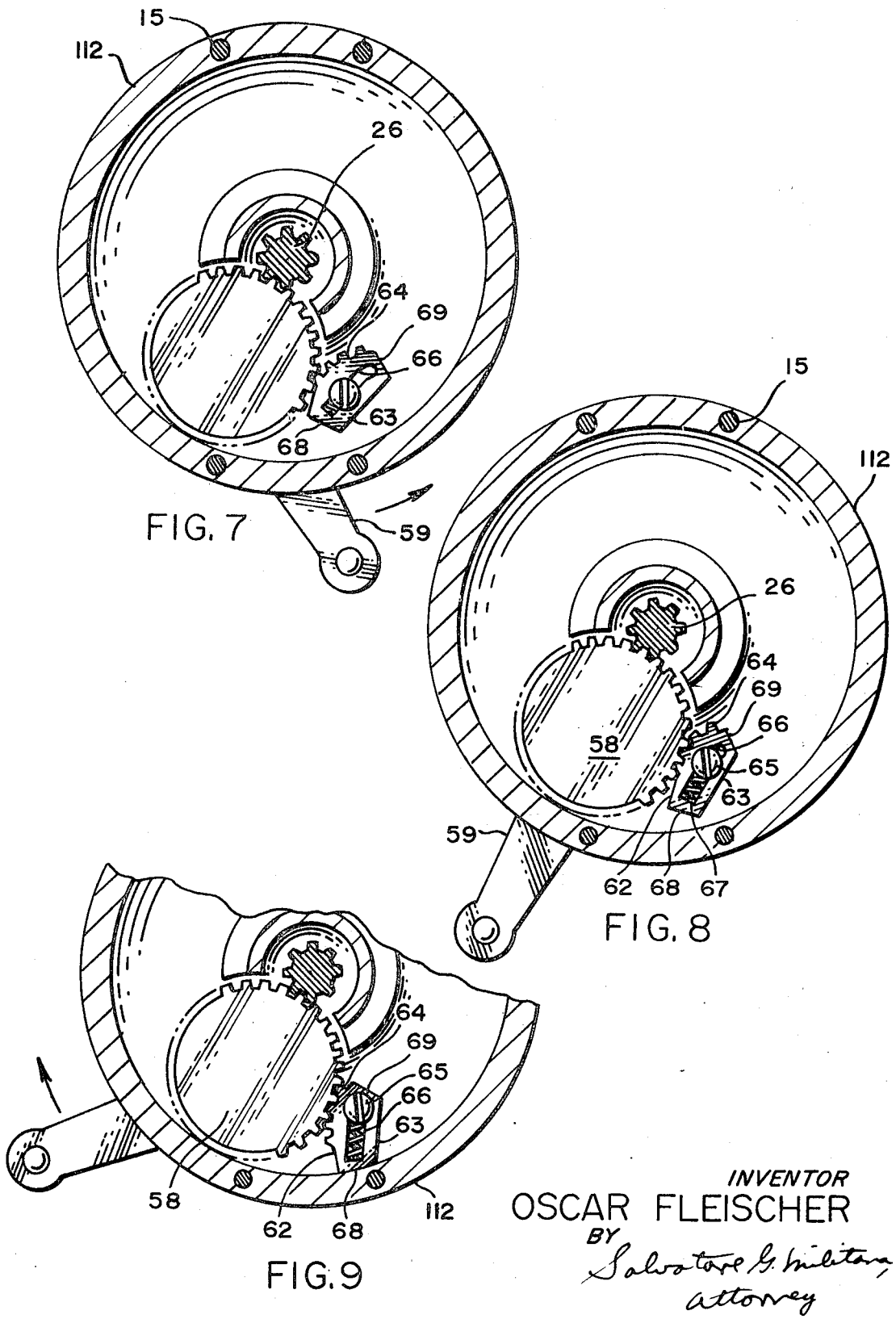

BRAKE MECHANISM FOR FISHING REELS

This is a continuation in part of my patent application entitled One Way Drive For Fishing Reels, U.S. Pat. application Ser. No. 869,489 filed on Oct. 27, 1969, and an improvement of my U.S. Pat. No. 3,428,268, issued on Feb. 18, 1969, for Brake For Fishing Reel.

In my patent I show and describe a plurality of brake structures for fishing reels, one of which consists of a splined shaft upon which rotatably mounted is a spool having a concentrically disposed sleeve secured thereto. A plurality of alternatingly positioned brake discs, driven discs and drive discs are mounted on the splined shaft. The drive discs are mounted to rotate with the splined shaft, the driven discs rotate freely of the splined shaft but are secured to rotate with the sleeve and spool while the brake discs are mounted to rotate freely of the splined shaft and sleeve and spool. Upon the axial displacement of the aforementioned discs in a direction to force them to become frictionally engaged, braking pressure will be exerted by the brake discs to compel the spool and splined shaft to rotate in unison when fishing line is being wound on the spool. However, in the event there is a greater force pulling on the fishing line to unwind same from the spool than the braking pressure, then the spool will rotate to unwind the line therefrom so that the splined shaft is ineffective to wind the line on the spool until the force pulling on the fishing line is decreased to below that of the braking pressure or the braking pressure on the brake discs are increased beyond that of the line pulling force.

In the present invention, I provide an improved brake mechanism by eliminating the sleeve upon which the spool is mounted and utilizing only a plurality of drive discs and driven discs wherein the drive discs constitute the brake discs.

Therefore, a principal object of the present invention is to provide a brake mechanism for a fishing reel utilizing only drive and driven discs directly connected to the drive shaft and reel respectively with the drive discs operating as a brake whereby the drag in the fishing reel may be adjusted to any desired degree by a simple manipulation of a handle which slides the discs axially into frictional engagement with each other and a greater braking power achieved thereby.

A further object of the present invention is to provide a brake mechanism for fishing reels with drive disc brakes having concave side walls engaging driven discs whereby only the peripheral side edge portions are in frictional engagement with the driven discs when a slight drag on the reel is desired and upon increasing the drag more of the side walls of the drive discs engage the driven discs to effect a positive and constant drag on the reel.

Another object of the present invention is to provide a brake mechanism for fishing reels which is simple in construction, readily assembled and inexpensive in original cost and maintenance due to the utilization of a minimum of parts.

A still further object of the present invention is to provide a brake for fishing reels whereby upon the application of drag to the reel, the heat created thereby is minimal remains in the brake mechanism and is not transferred to the spool to cause the deterioration of the filament fishing line as occurs in the present fishing reels.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

Figure 2:
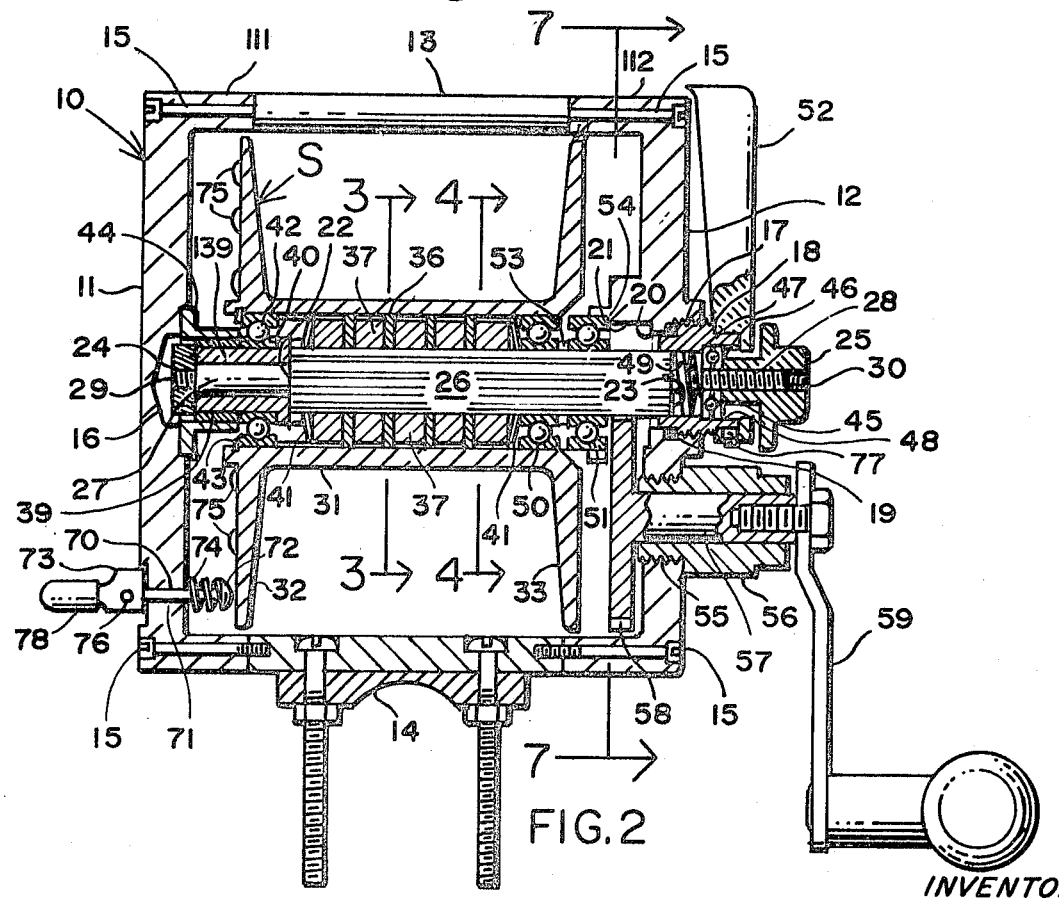
FIG. 2 is a longitudinal cross-sectional view taken along the line 2—2 of FIG. 1.
Figure 3:
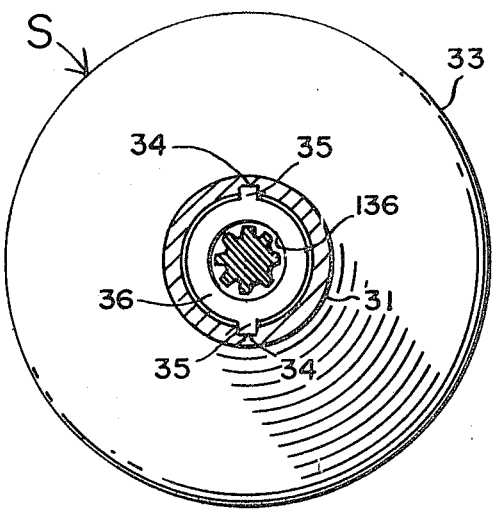
Figure 4:
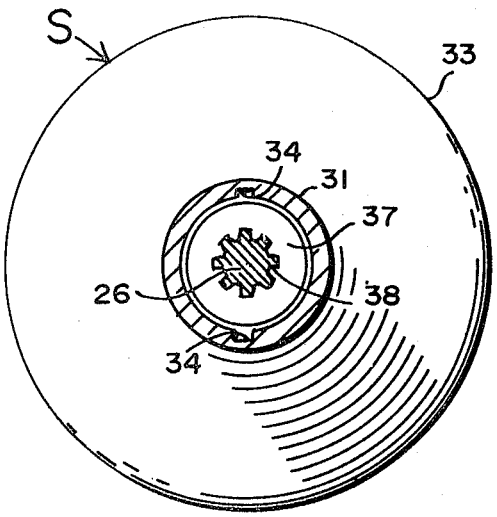

FIGS. 3 and 4 are transverse cross-sectional views taken along the lines 3—3 and 4—4 respectively of FIG. 2.

Figure 5:
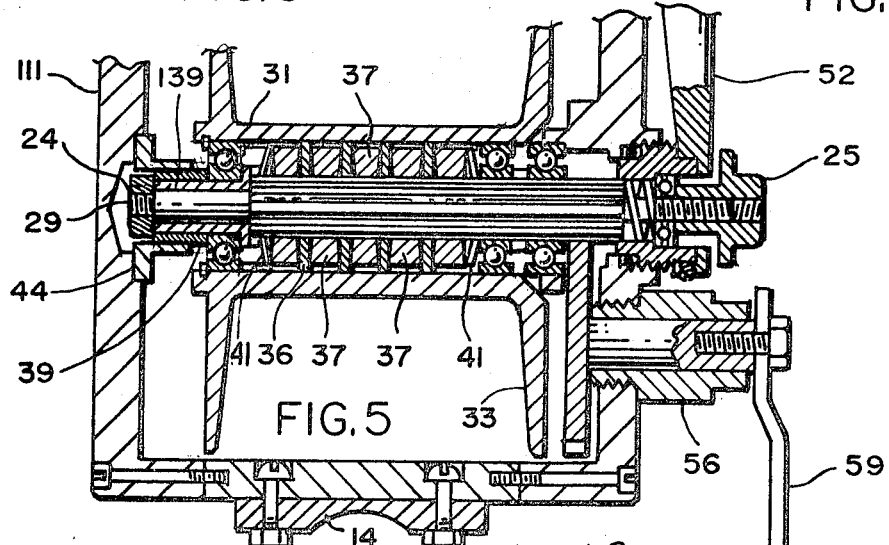

FIG. 5 is a fragmentary cross-sectional view similar to FIG. 2 showing the brake mechanism when the reel drag is at maximum condition.

Figure 6:
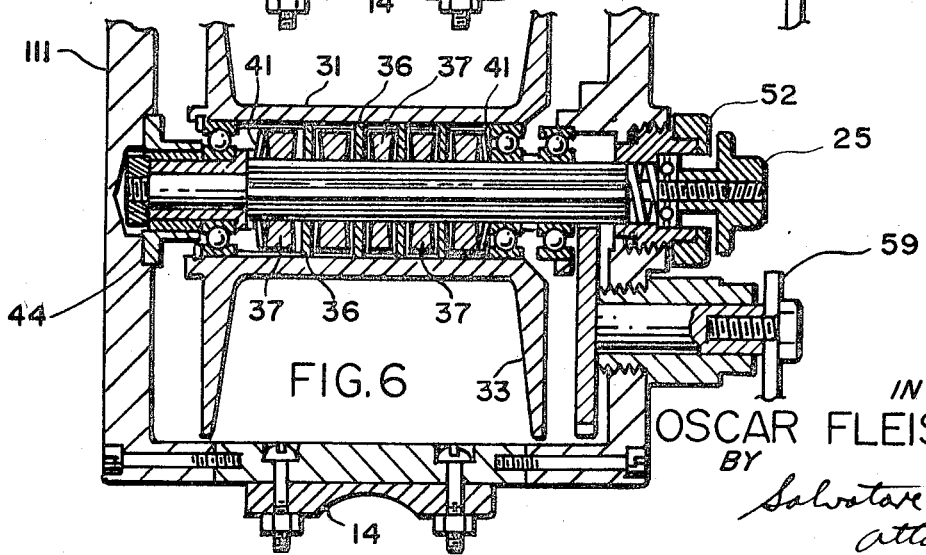

FIG. 6 is a similar view with the reel drag being at minimum condition.

FIG. 7 is a cross-sectional view taken along the line 7—7 of FIG. 2 showing the arrangement of parts when the reel is being rotated by the operating handle.

FIGS. 8 and 9 are similar views showing the position of the arcuate gear section to prevent the reverse rotation of the operating handle when the spool is rotating to unwind the fishing line.

Figure 10:
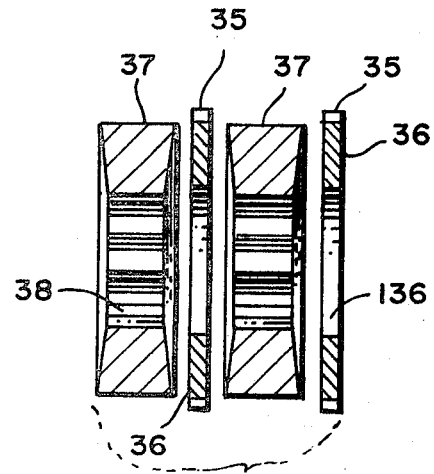

FIG. 10 is an enlarged cross-sectional view of a few of the brake and drive discs illustrating their side-by-side position.

Referring to the drawings wherein like numerals are used to designate similar parts throughout the several views, the numeral 10 refers to my fishing reel having end casings 11 and 12 at the ends thereof joined by crossmembers 13 and reel seat 14 all of which extend between the rim portions 111 and 112 of the end casings 11 and 12 and secured thereto by screws 15. In addition there is a rotatable shaft 26 extending between the end casings 11 and 12 at the axes thereof extending through bores 16 and 17 in the end casings 11 and 12 respectively. The bore 16 in the end casing 11 is a blind bore extending from the inner surface of the casing 11 while the bore 17 is threaded with left-hand threads to receive a brake-adjusting sleeve 18 to which an operating lever 52 is secured by means of a setscrew 77 as is explained in detail hereinafter. An O-ring 19 is positioned between the inner end of the threaded sleeve 18 and a shoulder formed by a peripheral ridge 20 formed about the periphery of the bore 17 at the position of the threaded portion with the inner portion of the bore 17 being smooth as at 21. In lieu of the O-ring 19 a nylon setscrew may be used since the latter can be adjusted when it becomes worn, whereas the O-ring 19 has to be replaced when worn upon extended use.

The shaft 26 is splined along most of its length having reduced diameters that form shoulders 22 and 23 at its ends 27 and 28 with the extreme end portions being threaded as at 29 and 30 to receive nuts 24 and 25 respectively. Mounted on the shaft 26 is a line-receiving spool S consisting of a pair of flanges 32 and 33 having a hub 31 disposed therebetween with the splined shaft 26 extending axially of the hub 31 and in spaced relation thereto. The inner surface of the hub 31 is provided with a pair of oppositely positioned slots 34 extending longitudinally thereof. The slots 34 receive lugs 35 formed on drive discs 36 that are rotatably mounted on the splined shaft 26. The drive discs 36 are provided with centrally disposed bores 136 that have a larger diameter than that of the splined shaft 26 so that the drive discs 36 may rotate freely of the splined shaft 26 but by virtue of the interengaging lugs 35 of the drive discs 36 with the slots 34 of the spool S the drive discs 36 must rotate in unison at all times with the spool S or vice versa.

Alternatingly mounted on the splined shaft 26 between the drive discs 36 are brake discs 37 made of asbestos and the like whose diameter is less than that of the hub 31 of the spool S so that at no time do the brake discs 37 directly engage the spool hub 31. The brake discs 37 are provided with a centrally disposed bore 38 with slots along its periphery conforming with the splines on the shaft 26 whereby the slotted bore 38 receives the splined shaft 26 and fits snugly thereon compelling the brake discs 37 to rotate in unison with the splined shaft 26.

Mounted on the end 27 of the shaft 26 is a spacer sleeve 39 having a flange 40 at one end that engages the shoulder 22 of the shaft 26. The other end of the spacer sleeve 139 is engaged by the nut 24 that is threaded on the threaded end 29 of splined shaft 26. A ball bearing race assembly 42 is keyed to the end of the hub 31 as at 43 and mounted on the sleeve 139 in engagement with the flange 40 permitting the relative rotational movements of the spool S and the splined shaft 26. A second sleeve 39 is mounted on the spacer sleeve 139 engaging the bearing race 42 at one end and the nut 24 at its other end.

The engagement of the ball bearing race 42 by the flange 40 is the limit position of the splined shaft 26 in its sliding movement to the left as seen in FIG. 2. The end of the second sleeve 39 is slidably received by a flanged socket 44 that is fastened to the end casing 11 at the position of the bore 16. By virtue of this construction, upon the sliding movement of the splined shaft 26 to the right, the spacer sleeve 139, sleeve 39, ball bearing race 42 and spool S slide in unison to the right.

At the other end 30 of the splined shaft 26, the nut 25 which is threaded thereon is provided with a spacer portion 45 engages a bearing race 46 mounted in a recess 48. The bearing 46 engages a shoulder 47 formed in the recess 48. A coil spring 49 mounted about the shaft end 28 extends between the shoulder 23 of the splined shaft 26 and the bearing race 46. At the position of the hub flange 33 is a pair of bearing races 50 and 51 spaced apart by a space washer 53, the race 50 rotatably supporting the spool S on the shaft 26 while the race 51 rotatably supports the shaft 26 on the end casing 12. The bearing race 51 engages a shoulder 54 formed in the smooth bore 21 of the end casing 12. Spring washers 41 are positioned at each end of the splined shaft 26 extending between the end brake discs 37 and the flange 40 at one end and the bearing race 50 at the other end of the shaft 26. Since the bearing races 50 and 51 are impeded from sliding to the right as viewed in FIG. 2, any sliding movement to the right of the shaft 26 along with the spacer sleeve 139 with its flange 40, sleeve 39, ball bearing race 42 and spool S will cause the spring washers 41 to yield and effect a compression of the brake discs 37 with the consequent frictional engagement of the drive discs 36 by the brake discs 37.

In the end casing 12 there is a second threaded bore 55 in which a spacer sleeve 56 is threadedly mounted. Rotatably mounted in the spacer sleeve 56 is a shaft 57 having a gear 58 mounted at its inner end, which gear 58 is in mesh engagement with the splined shaft 26. At the outer end of the shaft 57 is an operating handle 59 for rotating the gear 58 which in turn rotates the splined shaft 26. Also, mounted in my reel 10 is a one-way drive mechanism shown and described in detail in my aforementioned patent application and shown only by way of illustration for preventing the reverse rotation of the splined gear 26, gear 58 and operating lever 59.

To prevent the reverse rotation of the gear 58 and the shaft 26, I provide an arcuate gear section 63 having one side partially smooth as at 62 and partially occupied by a plurality of gear teeth 64 that is in mesh engagement with the teeth of the gear 58. The arcuate gear section 63 is movably mounted on the inner surface of the end casing 12 by a large headed screw 65 received in an elongated arcuate slot 66 formed in the gear section 63. A coil spring 67 is positioned in the arcuate slot 66 and extends between the screw 65 and the lower end portion 68 of the arcuate gear section 63 and yieldingly urging the arcuate gear section 63 to slide downwardly with the screw 65 engaging the upper end portion 69 and the lower end portion 68 engaging the rim 112 of the end casing 12.

When the operating lever 59 is actuated to rotate the spool S for winding the fishing line thereon, the gear 58 will rotate in a counterclockwise direction as viewed in FIGS. 5-7 and engage the teeth 64 of the arcuate gear section 63 to slide the latter upwardly against the spring pressure 67 to the position as shown by FIG. 7. When the operating lever 59 has stopped rotating, the force of the coil spring 67 will cause the arcuate gear section 63 to slide downwardly until at least one of the teeth 64 or more, as shown by FIG. 8, is in mesh engagement with the teeth of the gear 58. If the handle 59 is reversed in rotation, that is if an attempt is made to rotate the handle 59 in a counterclockwise direction as viewed in FIG. 1, which would tend to rotate the gear 58 in a clockwise direction as viewed by FIGS. 5-7, the meshed teeth of the gear 58 and arcuate gear section 63 will cause the arcuate gear section 63 to slide downwardly along the screw 65 until the end 68 of the arcuate gear section 63 engages the rim 112 at which time at least three teeth of the two gears 58 and 63 are in mesh engagement to prevent any further rotation of the gear 58. Consequently the arcuate gear section 63 prevents any reverse rotation of the operating handle 59 without affecting or inhibiting in any manner the rotation of the operating handle 59, gear 58 and spool S to wind the fishing on the spool S. The unwinding of fishing line from the spool S can only be effected by the pull of a fish tugging on the fishing line as it exceeds the amount of drag placed on the spool S as explained in detail hereinabove.

A clicking mechanism consisting of members 70, 71, 73, 74, 75, 76 and 78 and actuation of which will produce a clicking noise when the spool S is rotated also forms no part of the present invention.

Figure 1:
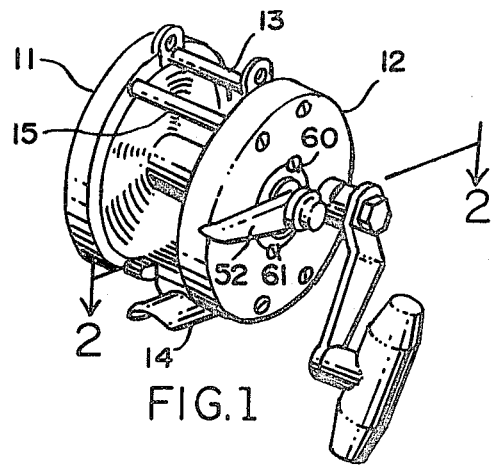
FIG. 1 is a perspective view of a fishing reel embodying my invention.

As is noted from the above description taken in connection with the drawings, in particular FIGS. 1-4 inclusive, upon rotating the operating handle 59 in a clockwise direction as viewed in FIG. 1, the gear 58 will cause the splined shaft 26 to rotate causing the brake discs 37 to rotate therewith since their inner portions are slotted as at 38 to receive the splines of the shaft 26. The spool S may or may not rotate upon actuation of the operating handle 59 depending upon the amount of braking effect determined by the frictional engagement between the drive discs 36 and brake discs 37 as determined by the position of a brake operating lever 52. Upon swinging the brake-operating lever 52 secured by setscrew 62 to the sleeve 18 from one limit post 61 to the other limit post 60, the sleeve 18 will thread outwardly of the threaded bore 17 causing the shaft 26 to move or slide axially in the direction away from the end casing 11 and toward the end casing 12. Moving with the shaft 26 is the flange 40 of the sleeve 39 which forces the spring washers 41 and the drive discs 36 and brake discs 37 into greater frictional engagement since the bearings 50, 51 cannot move axially due to the bearing 51 being in engagement with the shoulder 54 in the end casing 12. The amount of frictional engagement between the drive discs 36 and brake discs 37 determine the amount of drag which is the force required by a fish or any other object tugging on a line wound about the spool S to cause the spool S to rotate in a reverse direction so as to unwind line from the spool S. However, the spool S alone will rotate in the reverse direction since the one way drive mechanism mentioned hereinabove prevents the reverse rotation of the splined shaft 26. The brake discs 37 have concave sidewalls, that is, the width of the brake disc 37 being largest at its periphery, the width diminishing in the direction of the slotted bore 38. When the brake effect of the brake discs 37 is at a minimum the lever 52 will be positioned at the post 61 and the brake discs 37 will be in slight engagement with the adjacent driving discs 36 at the periphery of the brake discs 37. As the braking lever 52 is pivoted toward the post 62, the brake left-hand threads of the bore 17 will cause the threaded sleeve 18 to thread outwardly of the bore 17 and cause the splined shaft 26 to slide axially toward the right as seen in FIG. 2, carrying the flange 40 which moves in the direction of the drive discs 36 and brake discs 37. The latter are prevented from sliding to the right since the bearing races 50, 51 cannot slide axially. The compressible brake discs 37 are now compressed into frictional engagement with the drive discs 36. Since the sides of the brake discs 37 are concave, more of the sidewall surfaces of the brake discs 37 come into contact with the drive discs 36 as the drag-operating lever 52 is rotated toward the limit post 60. As long as there is a greater pulling force on the fishing line tending to unwind the fishing line from the spool S than the frictional force exerted between the plurality of brake discs 37 and driving discs 36, the spool S will rotate to unwind the fishing line from spool S while the splined shaft 26, gear 58 and handle 59 will be motionless.

By swinging the drag operating lever 52 closer toward the limit post 60, the frictional engagement between the brake discs 37 and drive discs 36 will increase, thereby producing a greater drag, that is, a greater force necessary to cause the reverse or unwinding rotational movement of the spool S. When the lever 52 is swung to the position of the limiting post 60, the drive discs 36 and brake discs 37 will be so tightly engaging each other that the drag will be at maximum position. The resultant braking power is so tremendous as to have the holding power to successfully exhaust and catch fish of tremendous weight and proportion, such as tuna, within a relatively short period of time, because of the fact that the drag does not fade out but has the unique ability to hold constantly, which characteristic of my fishing reel 10 is not found present in conventional fishing reels.

With the construction as described hereinabove in connection with the accompanying drawing, my fishing reel 10 may be readily serviced because of the ease with which the braking discs 37 and the various component parts thereof may be repaired or replaced if required. The reel 10 is relatively inexpensive to produce because of the simplicity of its mechanism, the relatively small number of parts, and the ease with which the respective parts can be assembled. Since the braking mechanism is completely enclosed within the hub, foreign matter is prohibited from entering and thereby the useful life of the reel is extended over a considerable period of time.

I claim:

1. A fishing reel comprising a pair of spaced apart end casings having axially disposed openings, one of said openings having a threaded portion, a splined shaft extending through said openings, a spool having a hub portion rotatably mounted on said shaft, a plurality of brake discs mounted on said shaft within said hub, said brake discs having slotted portion received by said shaft whereby said brake discs rotate in unison with said shaft, said hub having a longitudinally disposed slotted portion along its inner surface, a plurality of driven discs rotatably mounted on said shaft, each of said driven discs being adjacent said brake discs, said driven discs having lug portions received by said slotted portion of said hub whereby said driven discs rotate in unison with said spool, bearing means mounted on said shaft rotatably supporting said spool at substantially end portions of said hub of said spool, shoulder means mounted adjacent each end of said shaft, sleeve means having a flange engaging one of said shoulders mounted at one end of said shaft, means secured to said one end of said shaft engaging said sleeve means and securing said sleeve means to said shaft, one of said bearing means engaging said one of said end casings, spring washer means mounted on said splined shaft and engaging said end brake discs on said shaft, one of said spring washers means engaging said one of said bearing means and the other of said spring washer means engaging said flange of said sleeve means whereby upon the axial movement of said shaft said brake discs and said driven discs are brought into substantially equal frictional engagement with each other thereby providing said spool with a drag of constant force.

2. The structure as recited by claim 1 taken in combination with a threaded member received by said threaded portion in said one of said openings in said end casing and secured to said shaft for rotating said shaft, a lever secured to said threaded member, said threaded member having an opening for receiving said threaded end of said shaft and shoulder means in said opening, a nut secured to said other end of said shaft, bearing means mounted in said last named opening positioned between said shoulder and said last named nut and resilient means extending between said last named bearing means and said shoulder on said shaft.

* * * * *